(12) United States Patent
Kerstetter

(10) Patent No.: US 7,004,843 B1
(45) Date of Patent: Feb. 28, 2006

(54) FLEXIBLE UNIVERSAL JOINT SUB CONNECTION FOR DOWN HOLE MUD MOTOR METHOD AND APPARATUS

(76) Inventor: Scott Kerstetter, 103 Guernsey La., Youngsville, LA (US) 70592

( * ) Notice: Subject to any disclaimer, the term of this patent is extended or adjusted under 35 U.S.C. 154(b) by 0 days.

(21) Appl. No.: 10/732,052

(22) Filed: Dec. 9, 2003

(51) Int. Cl.
*F16D 3/18* (2006.01)

(52) U.S. Cl. .................................. 464/149; 464/157
(58) Field of Classification Search ............... 464/18, 464/19, 149, 156, 157; 175/101, 107; 403/364
See application file for complete search history.

(56) References Cited

U.S. PATENT DOCUMENTS

| | | | |
|---|---|---|---|
| 829,977 A * | 9/1906 | Lockwood | 464/149 |
| 855,106 A * | 5/1907 | Hensel | 464/149 X |
| 4,391,547 A * | 7/1983 | Jackson et al. | 464/157 X |
| 4,772,246 A | 9/1988 | Wenzel | |
| 4,982,801 A | 1/1991 | Zitka et al. | |
| 5,000,723 A | 3/1991 | Livingstone | |
| 5,205,789 A * | 4/1993 | Falgout, Sr. | 464/157 |
| 5,267,905 A | 12/1993 | Wenzel et al. | |
| 5,503,236 A | 4/1996 | Tibbitts | |
| 5,651,737 A * | 7/1997 | Le Blanc | 464/157 |
| 5,704,838 A | 1/1998 | Teale | |

* cited by examiner

*Primary Examiner*—Greg Binda
(74) *Attorney, Agent, or Firm*—Robert N. Montgomery

(57) ABSTRACT

A mud motor universal joint assembly that includes a pair of adjacent cylindrical joints having threaded connection means at one end and interlocking jaws at the other, each cylindrical joint having an internal blind tapered bore within the interlocking jaw portion containing a hard cylindrical load bearing member. The two joints are connected by a hardened cylindrical rod member inserted into the internal blind tapered bore of each joint and retained therein by perpendicular retaining pins. The joints, connecting rod, and bearing members are surface hardened to improve wear. No balls or seals are required and the internal hardened connecting rod and bearing members are easily replaced if necessary at a nominal cost.

16 Claims, 3 Drawing Sheets

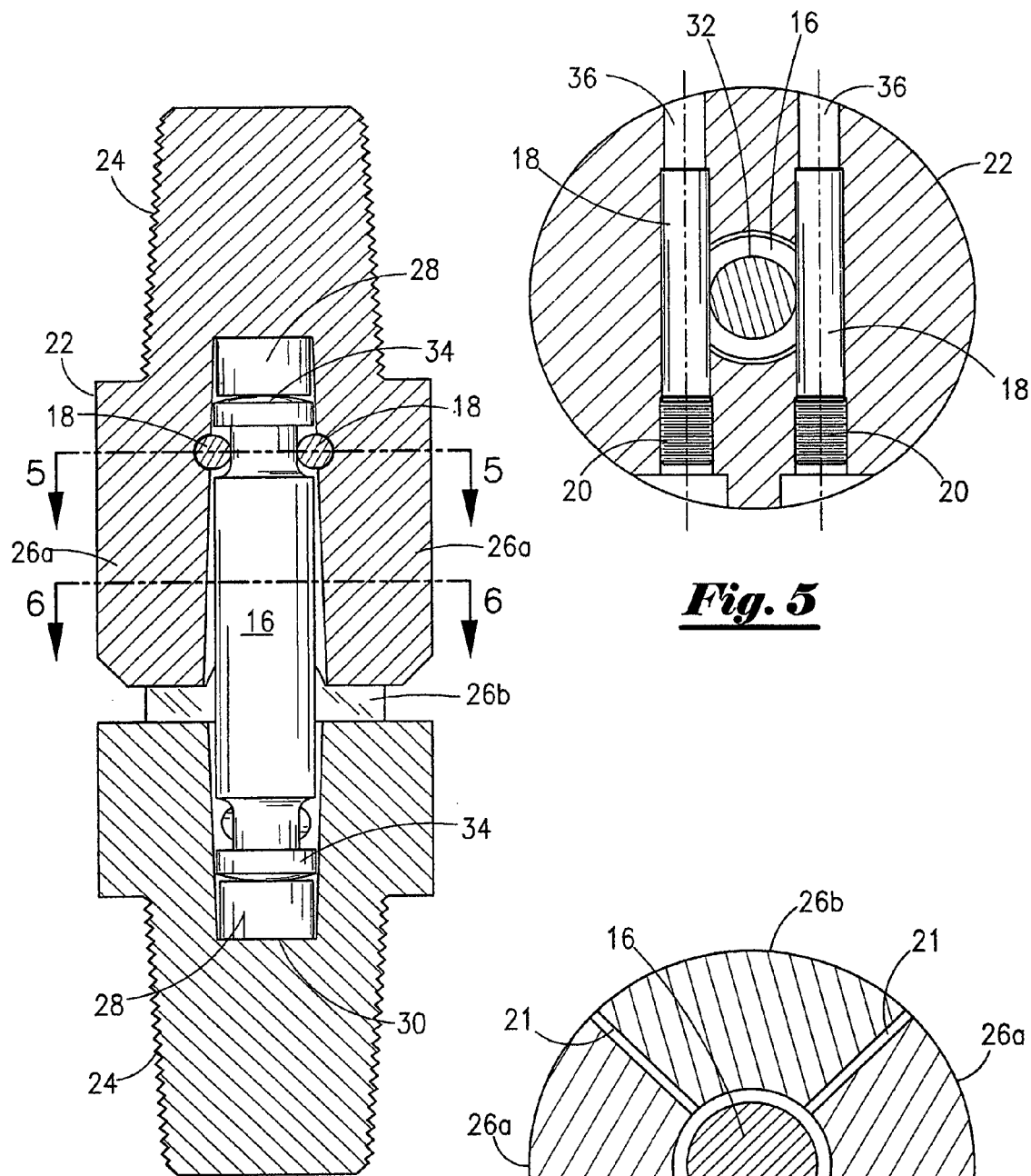
Fig. 4
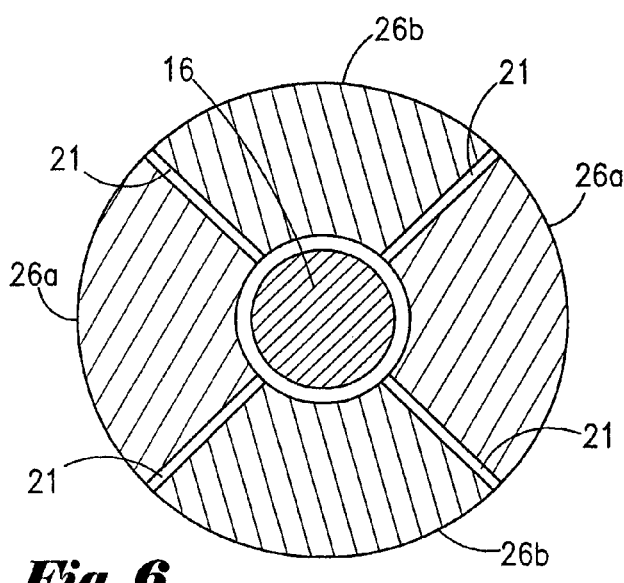
Fig. 5
Fig. 6

US 7,004,843 B1

FLEXIBLE UNIVERSAL JOINT SUB CONNECTION FOR DOWN HOLE MUD MOTOR METHOD AND APPARATUS

FIELD OF THE INVENTION

This invention relates generally to universal joints and more particularly to universal joints used in down hole mud motors.

GENERAL BACKGROUND

Down hole mud motors are used within the oil industry for earth boring operations. These mud motors rotate eccentrically. The eccentric rotation must be converted into concentric rotation in order for the drill bit to function correctly. The current state of the art generally accomplishes this conversion by providing a drive shaft having some type of universal joint connection that connects the down hole motor to a drive assembly rotating the drill bit.

It is generally believed that the drive shaft universal joint assembly cannot tolerate abrasive drilling fluids, thereby having an unacceptable adverse effect on the operational life of the drive shafts. Attempts have been made to effectively seal the universal joint assemblies so as to prolong their operational life. However, these universal joint assemblies do not readily lend themselves to conventional sealing arrangements. Universal joint wear in this instance is generally associated with pitting of the various ball surfaces that characterize these types of universal joint arrangements resulting from the high abrasiveness of the drilling fluids. Replacement of the joint or its components is a costly operation and thus to be avoided if at all possible.

Since the various sealing means have not been very successful, a new approach is clearly needed that would allow the joint to work in an abrasive environment for a significant time without a seal and then be relatively easy and inexpensive to replace as necessary.

SUMMARY OF THE INVENTION

What is really required is a more dependable and rugged drive shaft universal joint assembly, which is virtually unaffected by the harsh environment for a considerable time but which can be replaced quickly and easily at a nominal cost.

According to the invention there is provided a mud motor universal joint assembly that includes a pair of adjacent cylindrical joints having threaded connection means at one end of each joint. Each joint has interlocking jaws at the other end, each joint having an internal blind tapered bore within the interlocking jaw portion containing a hardened cylindrical load-bearing member. A hardened cylindrical rod member, inserted into the internal tapered bore of each joint and retained therein by perpendicular retaining pins, connects the two interlocking joints. The joints, connecting rod, and bearing members are surface hardened to improve wear. No balls or seals are required and the internal hardened connecting rod and bearing members are easily replaced, if necessary, at a nominal cost.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 4 is a vertical elevation cross section view of the assembled preferred embodiment;

FIG. 5 is a cross-section view of the retaining pin arrangement taken along sight lines 5—5 seen in FIG. 4; and FIG. 6 is a cross-section view of the locking jaws taken along sight lines 6—6 seen in FIG. 4

DETAILED DESCRIPTION OF THE PREFERRED EMBODIMENT

Figure 1:
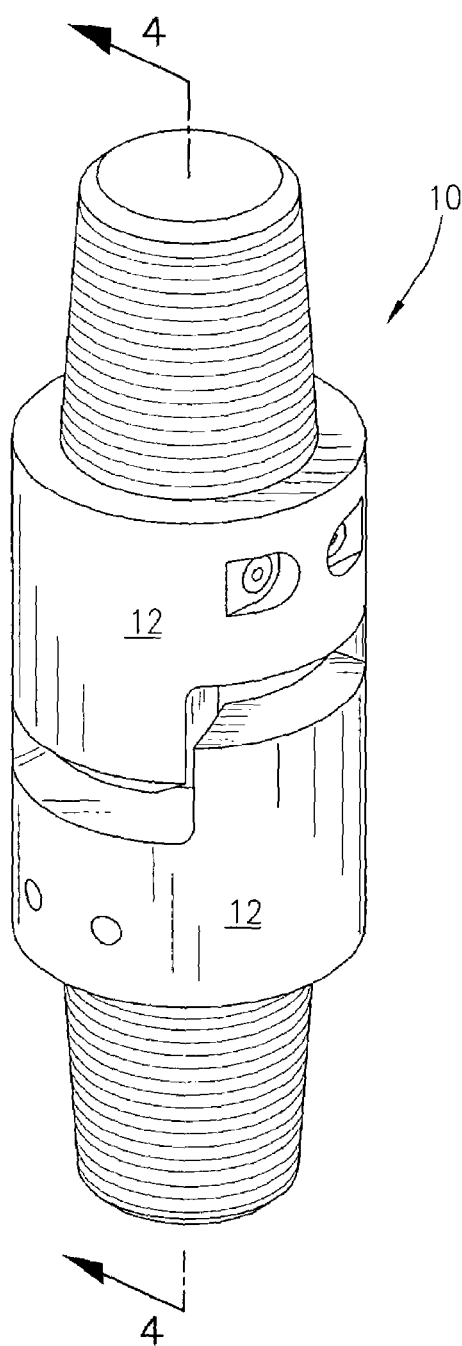
FIG. 1 is an isometric assembly view of the preferred embodiment.
Figure 2:
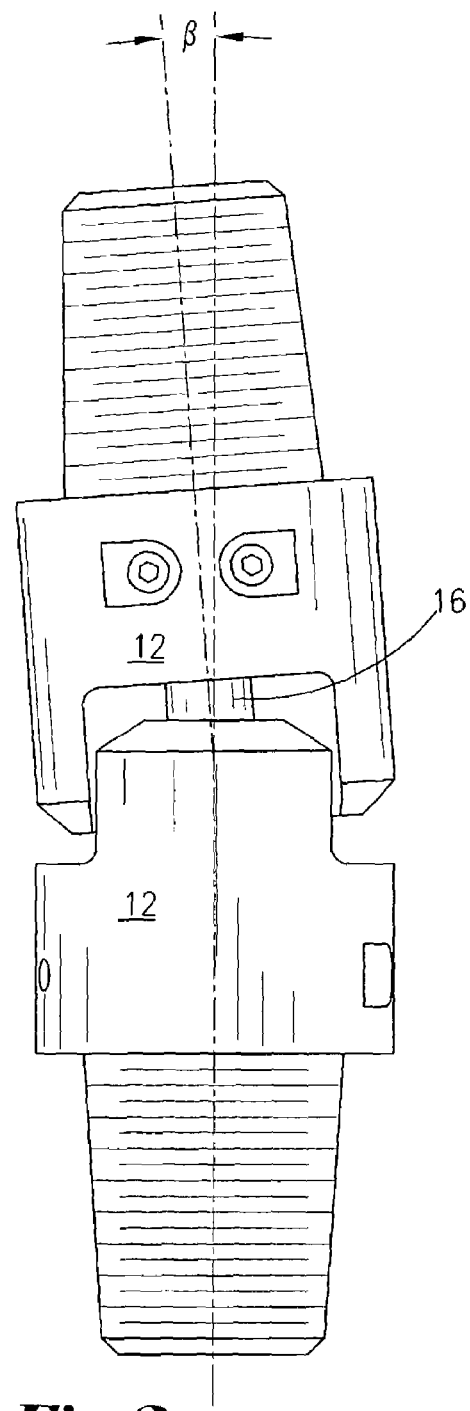
FIG. 2 is a side elevation view of the preferred embodiment.

As shown in FIG. 1 the disclosed universal joint assembly 10 includes a pair of interfacing joint member assemblies 12. Joint member assemblies 12, are loosely retained one to the other by the connecting rod 16 as shown in FIG. 2. This loose fitting arrangement allows torque to be transmitted from one member to the other via interfacing jaw portion while still allowing for angular defection "β". Unlike universal joints generally used in connection with mud motor drives, the joint assembly 10 does not rely on the connecting rod 16 to transmit torque. The connecting rod 16 simply retains the joint member assemblies 12 in close proximity with each other longitudinally. Obviously, angulations of the drive shaft may be increased by adding a second joint assembly connected by an intermediate tubular member thereby compounding the deflection angle "β" relative to the central axes of the joint assembly 10.

Figure 3:
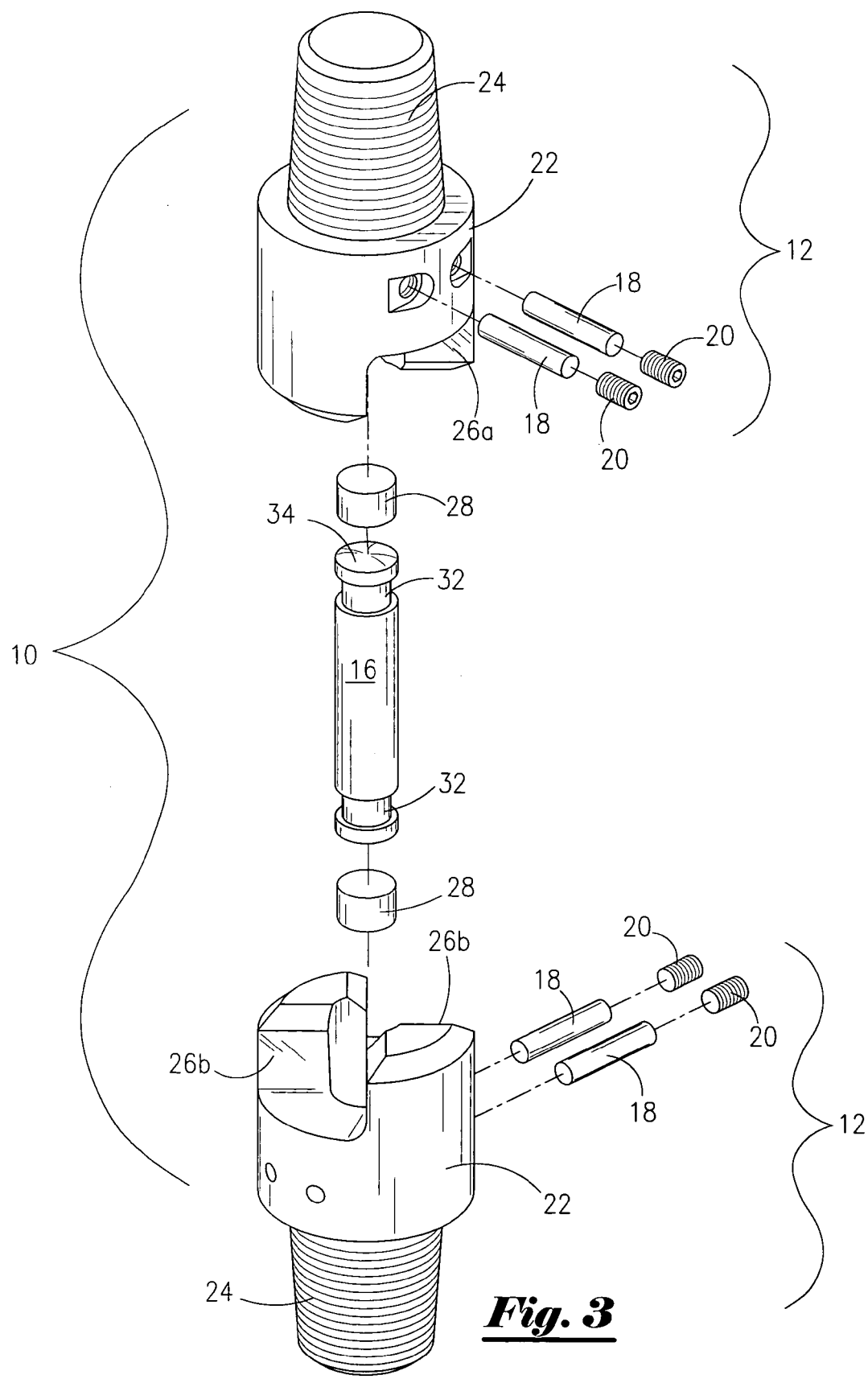
FIG. 3 is an exploded isometric view of the preferred embodiment component parts.

The joint member assemblies 12 as seen in the exploded view, FIG. 3, further include retainer pins 18 and setscrews 20 in addition to the joint members 22. Joint members 22 are identical and may be described as a cylindrical body member having a connection portion at one end which may be any of a variety of connection types, including the tapered tubular thread 24 shown here. The opposite end of the joint member 22 is machined in a manner whereby the end of the cylinder is centrally bored creating a tapered blind bore. The cylinder is then diametrically quartered outwardly from the central axis with opposing quarters removed for a predetermined depth, thus leaving a pair of wedge shaped, opposing mortised tangs 26a and 26b. The tangs 26a and 26b are slightly smaller in width than the removed quarter portions, thus allowing for a loose fit when interfacing the two joint members 12 as seen in FIG. 1. This spacing 21 is represented by the spacing between the tangs 26a and 26b as shown in cross section in FIG. 6 The upper edges of the tangs 26a and 26b are beveled to further reduce interference between the two joint members 12. A hardened steel cylindrical rod member serving as a hardened cylindrical bearing member 28 is slidably located in the bottom of the blind hole 30 in each of the cylindrical joint body members 22 as seen in FIG. 4. Connecting rod 16 is a hardened cylindrical rod having a reduced diametrical neck portion 32 and a radial or crowned head portion 34 at each end. At assembly a portion of the connecting rod 16 is slidably inserted into the blind bores of each of the body members 22. As shown in FIG. 4 the connecting rod 16 has sufficient length so as to maintain spacing between body members 22 relative to the connecting rod 16. Looking now at FIG. 5 we see that the cylindrical joint body members 22 are bored perpendicularly to accept the parallel retaining pins 18 at a point intersecting the neck portion of the connecting rod 16. Sufficient clearance between the neck portion of the connecting rod and the parallel retaining pins is provided to allow the connecting rod 16 to slide, rotate within the body members 22 and make pivotal contact with the bearing members 28. The parallel bores 36 extend clear through the joint members 22, thereby allowing access to the retaining pins 18 for removal. The bores 36 are then counter bored to receive the retaining pins 18 and counter bored again and tapped to receive the setscrews 20.

Crowning of the head portion 34 of the connecting rod 16 provides a very small contact surface between the head of the connecting rod and the hardened bearing surface of the cylinder member 28. Grit migrating into the blind bore and around the connecting rod is therefore not a problem due to this small contact surface. Due to the inexpensive nature of the connecting rod 16, the bearing cylinder member 28, and their ease of replacement by simply removing the retaining pins 18, repair cost is kept to a minimum.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A mud motor universal joint assembly comprising:
   a) a first cylindrical body member having a means for connecting to a drive at one end and a mortised pair of diametrically quartered tang portions, a central internal blind bore, and at least one perpendicular through bore intersecting said central internal blind bore at the opposite end;
   b) a second cylindrical body member having a means for connecting to a drive at one end and a mortised pair of diametrically quartered tang portions, a central internal blind bore, and at least one perpendicular through bore intersecting said central internal blind bore at the opposite end, said tang portions of said first and second cylindrical members being juxtaposed in a meshing manner;
   c) a cylindrical bearing member slidably inserted within each said internal blind bore;
   d) a connecting rod having a neck portion and a crowned head portion at each end, one end of said connecting rod being slidably inserted within each said central blind bore and in contact with each said cylindrical bearing member; and
   e) at least one retainer pin interposed within said perpendicular through bore of each cylindrical member in contact with each said neck portion of said connecting rod.

2. The mud motor universal joint assembly according to claim 1 wherein said at least one perpendicular through bore is counter bored to accept said retainer pin.

3. The mud motor universal joint assembly according to claim 2 wherein said at least one perpendicular through bore is counter bored and tapped to accept a means for capturing said retaining pin.

4. The mud motor universal joint assembly according to claim 1 wherein said means for connecting is an externally tapered thread.

5. The mud motor universal joint assembly according to claim 1 wherein each said central blind bore located within said first and second cylindrical body member is tapered.

6. The mud motor universal joint assembly according to claim 1 wherein a portion of said connecting rod is retained within each said blind central bore by at least one said retaining pin.

7. The mud motor universal joint assembly according to claim 1 wherein said connecting rod maintains said pair of cylindrical members in opposition and in a spaced apart relationship.

8. The mud motor universal joint assembly according to claim 1 wherein each said crowned head portion of said connecting rod makes rotational and pivotal contact with a corresponding one of said bearing cylinders.

9. The mud motor universal joint assembly according to claim 1 wherein torque is transmitted from one of said pair of cylindrical members to the other via said tang portions.

10. A mud motor universal joint assembly comprising:
    a) a first cylindrical body member having a taper threaded end and a diametrically quartered mortised end with two opposing quarters of said diametrically quartered mortised end removed to a prescribed depth, said mortised end further comprising a tapered central blind bore and a pair of parallel perpendicular bores intersecting said central blind bore;
    b) a second cylindrical body member having a taper threaded end and a diametrically quartered, mortised end with two opposing quarters of said diametrically quartered, mortised end removed to a prescribed depth, said mortised end further comprising a tapered central blind bore and a pair of parallel perpendicular bores intersecting said central blind bore said opposing quarters of said first and second cylindrical body members being in opposition and juxtaposed in a meshing manner;
    c) a cylindrical bearing member slidable within each said central blind bore;
    d) a connecting rod having a crowned head and a neck portion at each end, a portion of said connecting rod slidable within each of said central blind bores;
    e) a retaining pin locatable within each of said parallel perpendicular bores; and
    f) a means for capturing said retaining pins.

11. The mud motor universal joint assembly according to claim 10 wherein each of said perpendicular bores is counter-bored to accept said retainer pin.

12. The mud motor universal joint assembly according to claim 10 wherein at least one of said perpendicular bores is counter-bored and tapped to accept said means for capturing said retaining pin.

13. The mud motor universal joint assembly according to claim 10 wherein a portion of said connecting rod is retained within each said blind central bore by at least one said retaining pin.

14. The mud motor universal joint assembly according to claim 10 wherein said connecting rod maintains said first and second cylindrical joint body in meshed opposition and in a spaced apart relationship.

15. The mud motor universal joint assembly according to claim 10 wherein each said crowned head portion of said connecting rod makes rotational and pivotal contact with one of said cylindrical bearings.

16. The mud motor universal joint assembly according to claim 10 wherein torque is transmitted from said first cylindrical body member to said second cylindrical body member via each said two opposing quarters.

* * * * *